(12) United States Patent  
Black et al.

(10) Patent No.: US 9,082,069 B1
(45) Date of Patent: Jul. 14, 2015

(54) RELOCATION OF BLANK PAGES IN BOOKLET MAKING

(71) Applicant: XEROX CORPORATION, Norwalk, CT (US)

(72) Inventors: Brian Arthur Black, Penfield, NY (US); Lee David Roche, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/242,980

(22) Filed: Apr. 2, 2014

(51) Int. Cl.
*G06K 15/00* (2006.01)
*G06K 15/02* (2006.01)

(52) U.S. Cl.
CPC .......... *G06K 15/1885* (2013.01); *G06K 15/002* (2013.01); *G06K 15/025* (2013.01)

(58) Field of Classification Search
None
See application file for complete search history.

(56) References Cited

U.S. PATENT DOCUMENTS

| 6,088,710 | A | 7/2000 | Dreyer et al. |
| 7,099,037 | B2 | 8/2006 | Clark et al. |
| 7,203,900 | B2 * | 4/2007 | Nara et al. .................. 715/255 |
| 8,379,252 | B2 | 2/2013 | Honda |
| 8,553,274 | B2 | 10/2013 | Imine |
| 8,578,269 | B2 | 11/2013 | Osaka et al. |
| 8,724,166 | B2 * | 5/2014 | Nakabayashi ................ 358/1.9 |
| 2009/0116057 | A1 * | 5/2009 | Honda ......................... 358/1.15 |

FOREIGN PATENT DOCUMENTS

EP 0478351 4/1992

* cited by examiner

*Primary Examiner* — Thomas D Lee
(74) *Attorney, Agent, or Firm* — Gibb & Riley, LLC (57) ABSTRACT

Methods and devices receive instructions to print (on print media sheets) a booklet from a document, and automatically format the booklet to arrange multiple pages of the document to print on each of the print media sheets by performing duplex printing with multiple pages of the document being printed on each side of the print media sheets. The methods and devices automatically determine the number of blank page locations of the pages of the document occurring on the last pages of the booklet, and output a message that identifies the number of blank page locations and an option to relocate the blank page locations to different locations within the booklet. The methods and devices then receive a response regarding relocating at least one of the blank page locations, and automatically reformat the booklet to reposition the blank page locations.

20 Claims, 6 Drawing Sheets

RELOCATION OF BLANK PAGES IN BOOKLET MAKING

BACKGROUND

Systems and methods herein generally relate to methods and devices for making books and booklets, and more particularly to relocating blank pages within such books and booklets.

Books and booklets are commonly made utilizing duplex printing (printing on both sides of print media sheets) and N-up printing techniques (printing more than one document page on a side of a print media sheet). In one example, four document pages can be printed on a single print media sheet by printing two document pages on each side of the print media sheet. This print media sheet can then be folded along the area between the document pages providing an item similar to a greeting card that can be opened. Multiple sheets printed and folded in the same way can be joined together (stapled, bound, glued, etc.) to create books or booklets. Sophisticated systems determine the order and orientation of the document pages printed so that the pages of the document are sequential as the pages of the completed and bound booklet are turned by the reader of the book.

In the above example, each print media sheet has four locations where document pages can be located; however, the number of pages in the document may not be divisible by four, resulting in blank pages (blank document page locations) on up to three of the four available printing locations.

Therefore, when a booklet job contains a number of pages not equal to a multiple of four, blank pages are placed in the job starting from the back going forward (i.e. last page of the booklet, 2nd to last page in the booklet, then the 3rd to the last page in the booklet). For example, in a four page booklet, with three imaged pages, a blank page would be located on page four of the booklet. If the situation is not acceptable to the user, the user returns to the document creation/editing application to perform some pre-press work and create a new booklet job with a blank page on a different sheet (e.g., the second sheet) before resubmitting the booklet for printing, which can be time consuming and cumbersome.

SUMMARY

Exemplary methods receive, into a graphic user interface, instructions to print, on print media sheets, a booklet from a document. The methods automatically (e.g., using a computerized device connected to the graphic user interface, (without needing further user input)) format the booklet to arrange at least two (e.g., two, four, eight, etc.) pages of the document to print on each of the print media sheets by, for example, performing multi-page per side duplex printing, with at least one page of the document being printed on each side of each print media sheet. For example, four pages of a document can be printed on each sheet by printing two pages of the document on each side of each sheet. Subsequent formation of the booklet is performed by folding the printed sheets in half; and binding, gluing or stapling the print media sheets along the fold line of the sheets (where each sheet has four pages of the document printed thereon).

Then, such methods automatically (again using the computerized device, without needing further user input) determine the number of blank page locations of the document occurring on the last pages of the booklet. The blank page locations are those available printing locations on the print media sheets where pages of the document are available to be printed, but where no printing occurs because the number of pages of the document does not correspond with the number of available printing locations (e.g., where there are more document page locations on the print media sheets than there are pages of the document). In the example where four document pages are printed on each print media sheet, the last pages of the booklet could contain up to three blank page locations.

If there is at least one blank page location, these methods automatically delay printing and, instead, output a message on the graphic user interface that identifies the number of blank page locations, and provide an option to relocate such blank page locations to different locations within the booklet (so as give the user an option to automatically relocate the blank page locations to locations are other than on the last pages of the booklet). Note that such an option is automatically output without request from the user, and is provided on the graphic user interface in response to only the instruction to print the booklet. In response, such methods receive, into the graphic user interface, a response to the option to relocate the blank page locations. This response provides instructions regarding relocating the blank page locations.

With this, such methods automatically (again using the computerized device, without needing further user input) reformat the booklet to reposition some of the blank page locations to different locations within the booklet based on the user's response to the option. After reformatting, the methods can automatically (again, without needing further user input) print the booklet using a printing device operatively (meaning directly or indirectly) connected to the computerized device.

In addition, such methods can output, on the graphic user interface, a first graphic representation of an appearance of the booklet as it would be printed after the initial booklet formatting, but before reformatting or actual printing. Similarly, such methods can output, on the graphic user interface, a second graphic representation of an appearance of the booklet as it would be printed after such reformatting (before actually printing). These methods can further repeat, on the graphic user interface, the option to relocate the blank page locations to different locations within the booklet along with the second graphic representation to provide the user additional iterations of reformatting the booklet before any printing occurs (to conserve resources, save time, lower costs, increase user satisfaction, etc.).

Printing devices herein include a graphic user interface that receives instructions to print, on print media sheets, a booklet from a document; a processor operatively connected to the graphic user interface; and a printing device operatively connected to the computerized device. The processor automatically formats the booklet to arrange multiple pages of the document to print on each of the print media sheets by performing duplex printing, with pages of the document being printed on each side of the print media sheets.

Further, the processor automatically determines the number of blank page locations of the pages of the document that occur on the last pages of the booklet. Then, the graphic user interface automatically outputs a message identifying the number of blank page locations and provides an option to relocate the blank page locations to different locations within the booklet. Again, such different locations are other than on the last pages of the booklet. In response, the graphic user interface receives a response to the option from the user to relocate the blank page locations comprising user instructions regarding relocating at least one of the blank page locations. The processor then automatically reformats the booklet to reposition ones of the blank page locations to the different locations within the booklet based on the user's response to the option. Then, after such reformatting, the printing device automatically prints the booklet.

Again, the graphic user interface can output a first graphic representation of an appearance of the booklet as it would be printed, after formatting but before reformatting and printing, and can output a second graphic representation of an appearance of the booklet as it would be printed after the reformatting (before actually printing). When outputting the second graphic representation, the graphic user interface can also repeat the option to relocate the blank page locations to different locations within the booklet to provide additional iterations of the reformatting of the booklet.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, when the number of pages of a document being printed as a book or booklet is not divisible by the number of available document page printing locations per print media sheet, by default blank pages appear at the end of the book or booklet. However, some users may prefer a layout where such blank pages are used at other locations within the document, such as at the end of chapters, the end of paragraphs, etc. Rather than asking the user to manually alter the document by returning to the document creation/editing software application to edit the document to add blank pages (or page breaks) or manually make the number of pages of the document divisible by the number of available printing locations per print media sheet, the methods and devices herein provide a message and an option to the user (in response to only the user's print command) allowing the user to relocate such blank pages, without requiring the user to return to the document creation/editor to manually add pages to the document.

Therefore, the methods and devices herein allow for programming blank inserts into booklet jobs (without altering the document itself). With such systems and devices, the operator is able to select at the time of printing where the blank image should be placed in the booklet job. Continuing with the example of a booklet having four available printing locations per print media sheet, with systems and devices herein the user is prompted where within the booklet job up to three blank pages should be inserted. Upon selecting these options, the booklet job is printed with blank pages at the selected locations. For example, in a 21 page job scanned to be printed as a booklet utilizing four available printing locations per print media sheet, the methods and devices herein prompt the user where to place the three blank images (between page 1 and 24) that would otherwise all appear as the last three pages of the booklet.

Therefore, methods and devices herein allow users more flexibility in where blank pages are inserted in booklet mode, by allowing them to relocate blank pages that would otherwise appear at the end of the booklet by default. The methods and devices allow users to specify any location in the job for the insertion of the blank pages.

Figure 1:
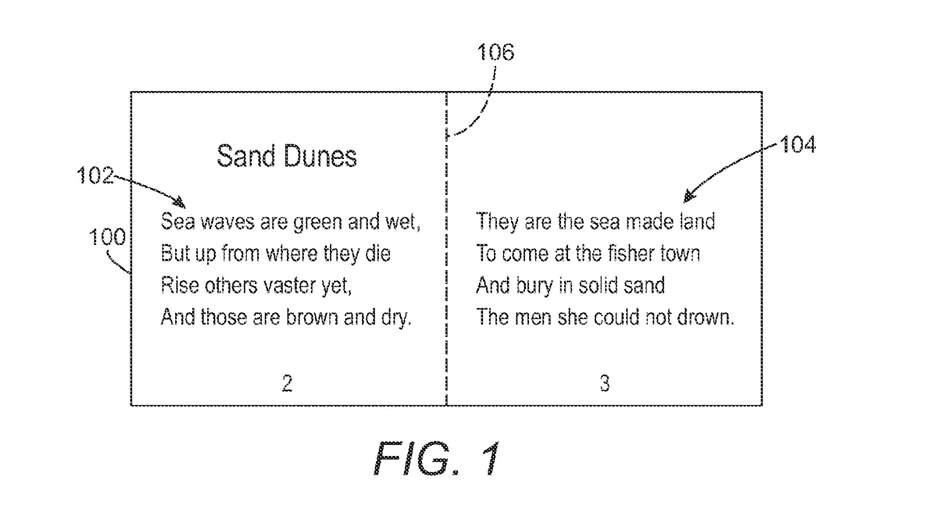
FIG. 1 is a schematic diagram illustrating operations of methods and devices herein.

FIG. 1 illustrates one side of a print media sheet 100 upon which two document pages (page 2 (102) and page 3 (104)) have been printed. The dashed line 106 in FIG. 1 represents the fold line. Pages 1 and 4 appear on the opposite side of sheet 100 and are out of view in FIG. 1. Therefore, FIG. 1 illustrates a simple booklet (or greeting card) type of printing where a document of four pages or less is printed on a single print media sheet 100.

Figure 2:
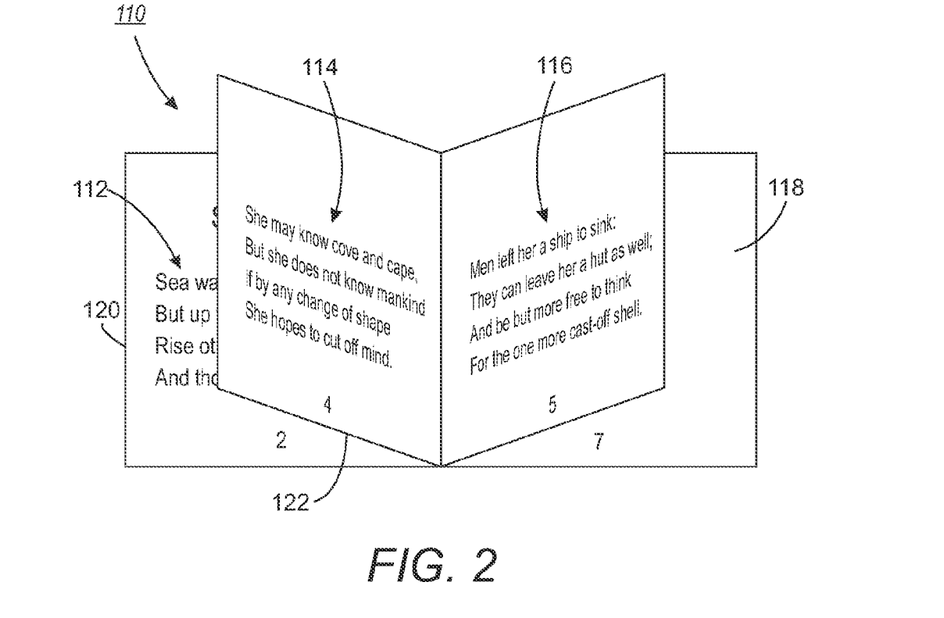
FIG. 2 is a schematic diagram illustrating operations of methods and devices herein.

FIG. 2 illustrates a booklet 110 formed from two print media sheets 120, 122, each of which is processed through duplex printing, with N-up printing of two document pages printed on each side of each print media sheet. More specifically, FIG. 2 illustrates one side of print media sheet 120 (the opposite side is out of view) upon which page 2 (112) and page 7 (118) of the document are printed. Similarly, FIG. 2 illustrates one side of print media sheet 122 (the opposite side is out of view) upon which page 4 (114) and page 5 (116) of the document are printed.

In the example shown in FIG. 2, the document is only five pages long and, therefore, booklet pages 6-8 are blank (while only blank booklet page 7 (118) is shown in FIG. 2 because of the perspective view in that drawing). In response to receiving a print command, rather than executing the print command, the methods and devices herein unexpectedly provide a pop-up notice to the user that there are three blank pages at the end of booklet, and provide the user an option to relocate any or all (or none) of the three blank pages.

Figure 3:
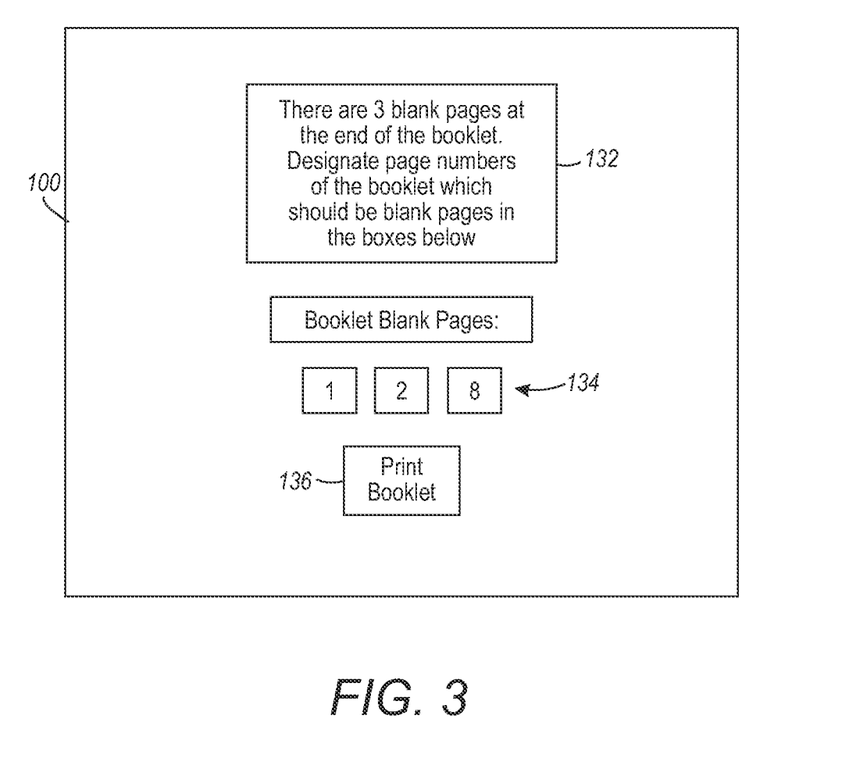
FIG. 3 is a schematic diagram illustrating a screenshot of methods and devices herein.

FIG. 3 illustrates an exemplary screenshot 130 of the graphic user interface that the methods and devices provide to the user. More specifically, FIG. 3 illustrates the notice 132 that there are three blank pages at the end of the booklet. Fill-in boxes 134 allow the user to designate page numbers of the booklet which should be blank pages. In this example, the user has selected pages 1, 2, and 8 as blank pages. Note that if only two blank pages were located at the end of the document, the user would only be provided two of the fill-in boxes 134, and one fill-in box if there were only one blank printing location, etc. The user can then select the print button 135 which will cause the print media sheets 120, 122 to be printed without further user action.

Figure 4:
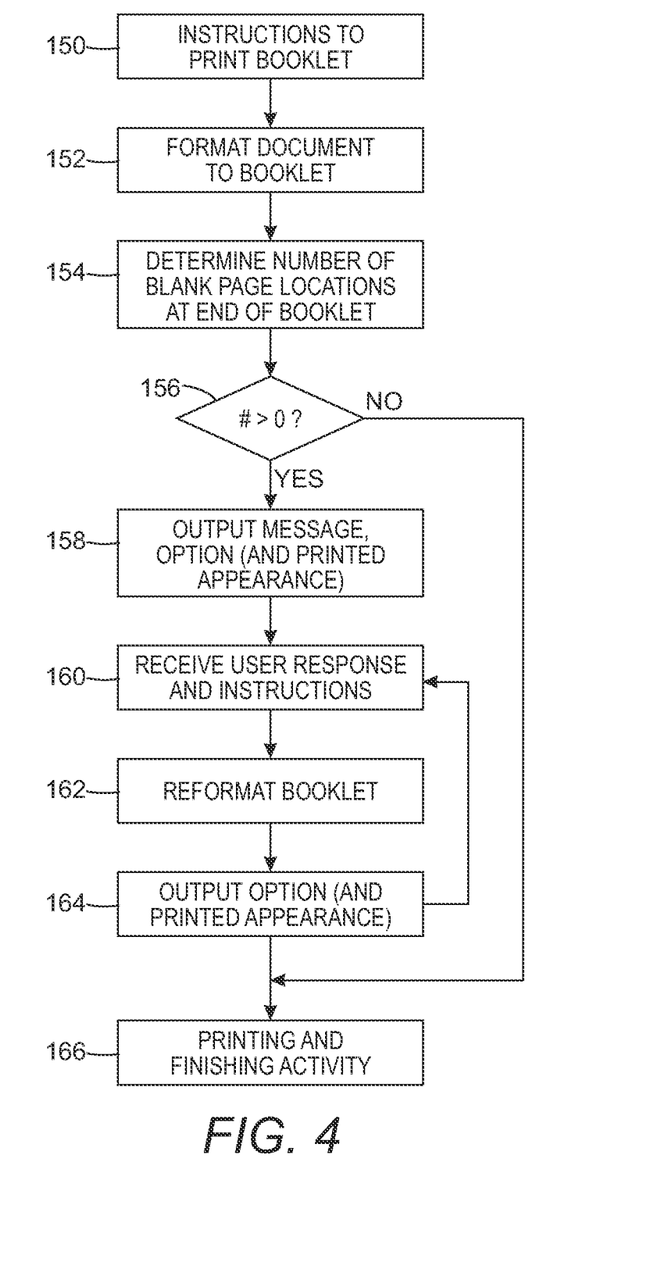
FIG. 4 is a flow diagram of various methods herein.

FIG. 4 is flowchart illustrating exemplary methods herein. In item 150, these exemplary methods receive, into a graphic user interface, instructions to print (a print command) on print media sheets, a book or booklet from a document. The instructions to print in item 150 can take many different forms. For example, the user can scan in a document using an optical scanner and instruct a printer to print the scanned document as a booklet (setting the N-up number, specifying duplex or simplex, etc.). Alternatively, a print book command can be placed through a document creation or document editing application (word processor, spreadsheet program, graphic design program, presentation program, photo creation program, etc.). In such cases, the instructions to print a book or booklet from the user received in item 150 contain all necessary parameters (printer identification, print media selection, print settings selection, N-up number, duplex/simplex, binding selection, etc.) to allow printing to proceed, and the user expects to take no additional action to cause the document to be printed on print media sheets as a book or booklet.

In item 152, the methods automatically follow the instructions in item 150 (e.g., using a computerized device operatively connected to the graphic user interface, without needing further user input). Thus, in item 152, in one example, these methods can format the document as a booklet to arrange at least two (e.g., two, three, four, six, eight, etc.) pages of the document to print on each of the print media sheets by, for example, performing multi-page per side duplex printing, with at least one page of the document being printed on each side of each print media sheet. For example, six pages of a document can be printed on each sheet by printing three pages of the document on each side of each sheet (with two fold lines per sheet). Subsequent formation of the booklet is performed by automatically or manually folding the printed sheets in half, in thirds, etc.; and binding, gluing or stapling the print media sheets along the fold line(s) of the sheets (as discussed in greater detail below).

Then, in item 154, such methods automatically (again using the computerized device, without needing further user input) determine the number of blank page locations of the document occurring on the last pages of the booklet. The blank page locations are those available printing locations on the print media sheets where pages of the document are available to be printed, but where no printing occurs because the number of pages of the document does not correspond with the number of available printing locations (e.g., where there are more available page locations on the print media sheets than there are pages of the document).

Those ordinarily skilled in the art would understand that any reasonable number of document pages can be printed on a single side of a print media sheet (e.g., one, two, four, eight, etc.) in N-up printing processes and that this number will determine the number of available printing locations of the print media sheets and also the number of potential blank pages locations that will remain in the booklet format after the last page of the document is printed. In the example where four document pages are printed on each print media sheet, the last pages of the booklet could contain up to three blank page locations. These methods subtract the total number of pages in the document from the total number of available printing locations (using the smallest number of sheets of media needed to just print all document pages) to calculate the number of blank page locations.

If there is at least one blank page location (e.g., the number of blank page locations being greater than zero (#>0) in item 156) these methods automatically delay printing and, instead, unexpectedly output a pop-up message on the graphic user interface in item 158 that identifies the number of blank page locations and provides an option to relocate such blank page locations to different locations within the booklet (so as give the user an option to automatically relocate the blank page locations to locations are other than on the last pages of the booklet(s)). Note that such an option in item 158 is automatically output without request from the user, and is provided on the graphic user interface in response to only the instruction to print the booklet. In response, such methods receive, into the graphic user interface, a response to the option to relocate the blank page locations (see FIG. 3). This response provides instructions regarding relocating the blank page locations.

With this, such methods automatically (again using the computerized device, without needing further user input) reformat the booklet in item 162 to reposition some of the blank page locations to different locations within the booklet based on the user's response to the option. After reformatting, the methods can automatically (again, without needing further user input) print the booklet and perform all booklet finishing operations (folding, stapling, etc.) using a printing device/finishing device(s) operatively connected to the computerized device in item 166.

In addition, such methods can optionally output, on the graphic user interface, a first graphic representation of an appearance of the booklet as it would be printed after the initial booklet formatting in item 158, but before reformatting 162 or actual printing 166. Similarly, such methods can optionally output, on the graphic user interface in item 164, a second graphic representation of an appearance of the booklet as it would be printed after such reformatting 162, but before actually printing 166. As shown by the return arrow from item 164 to item 162, these methods can further repeat, on the graphic user interface, the option to relocate the blank page locations to different locations within the booklet along with the second graphic representation to provide the user additional iterations of reformatting the booklet 162 before any printing occurs in item 166 (to conserve resources, save time, lower costs, increase user satisfaction, etc.).

Figure 5:
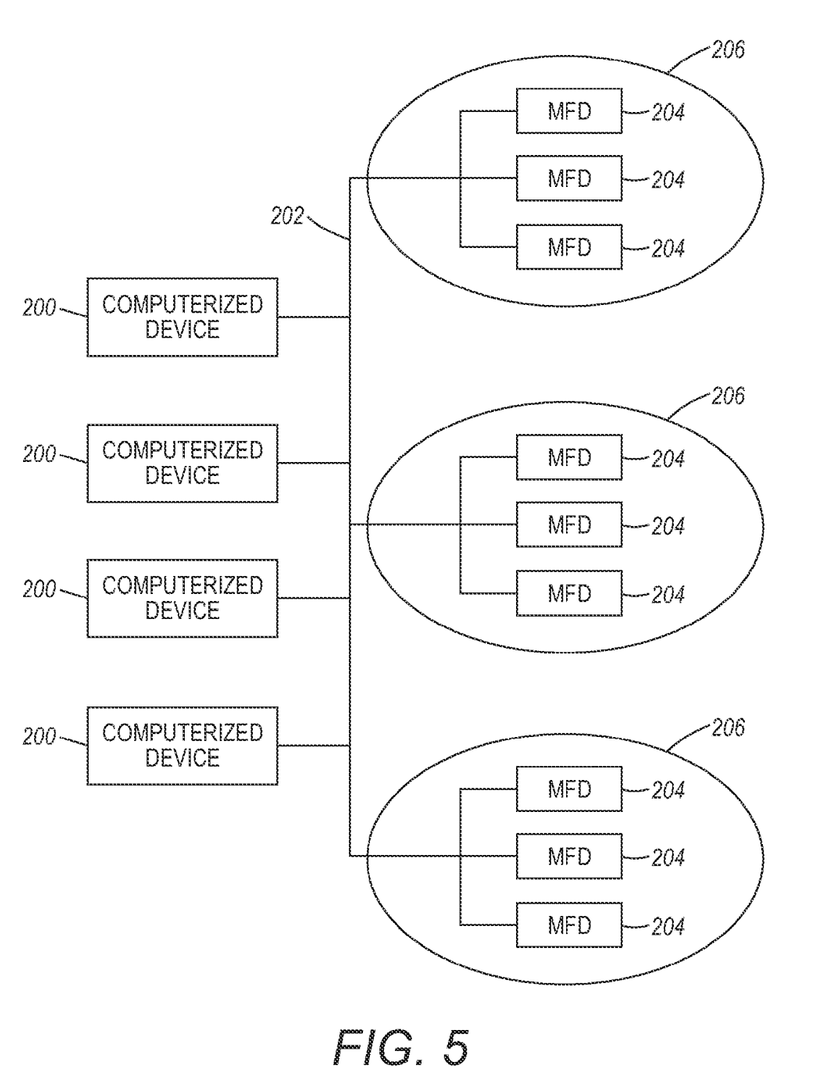
FIG. 5 is a schematic diagram illustrating systems herein.

As shown in FIG. 5, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 6:
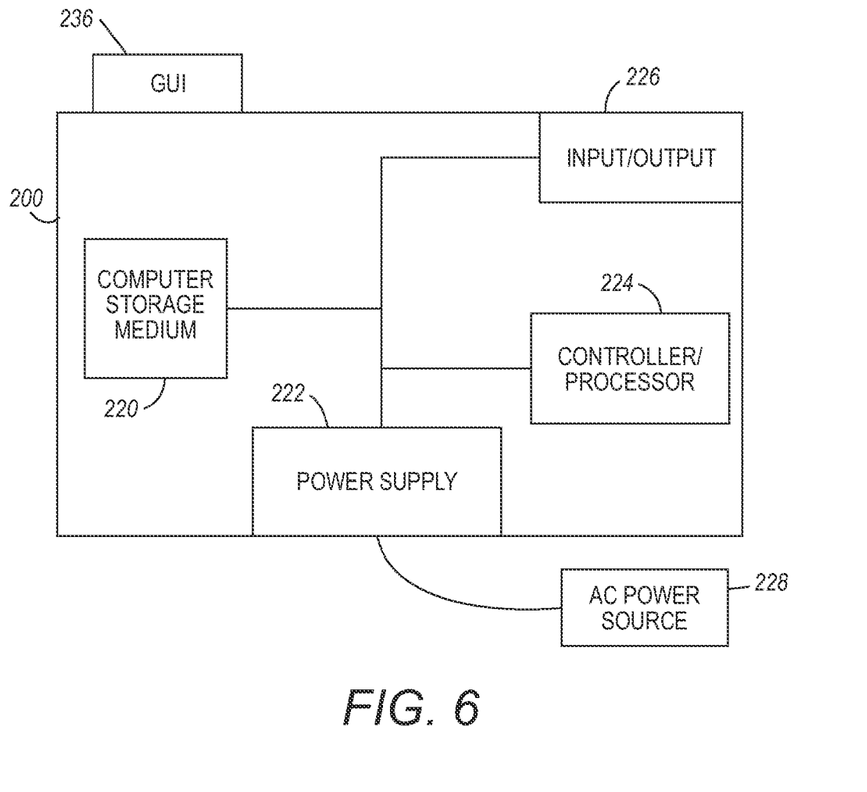
FIG. 6 is a schematic diagram illustrating devices herein.

FIG. 6 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 6, a body housing has one or more functional components that operate on power supplied from an alternating current (AC) source 228 by the power supply 222. The power supply 222 can comprise a power storage element (e.g., a battery, etc).

Figure 7:
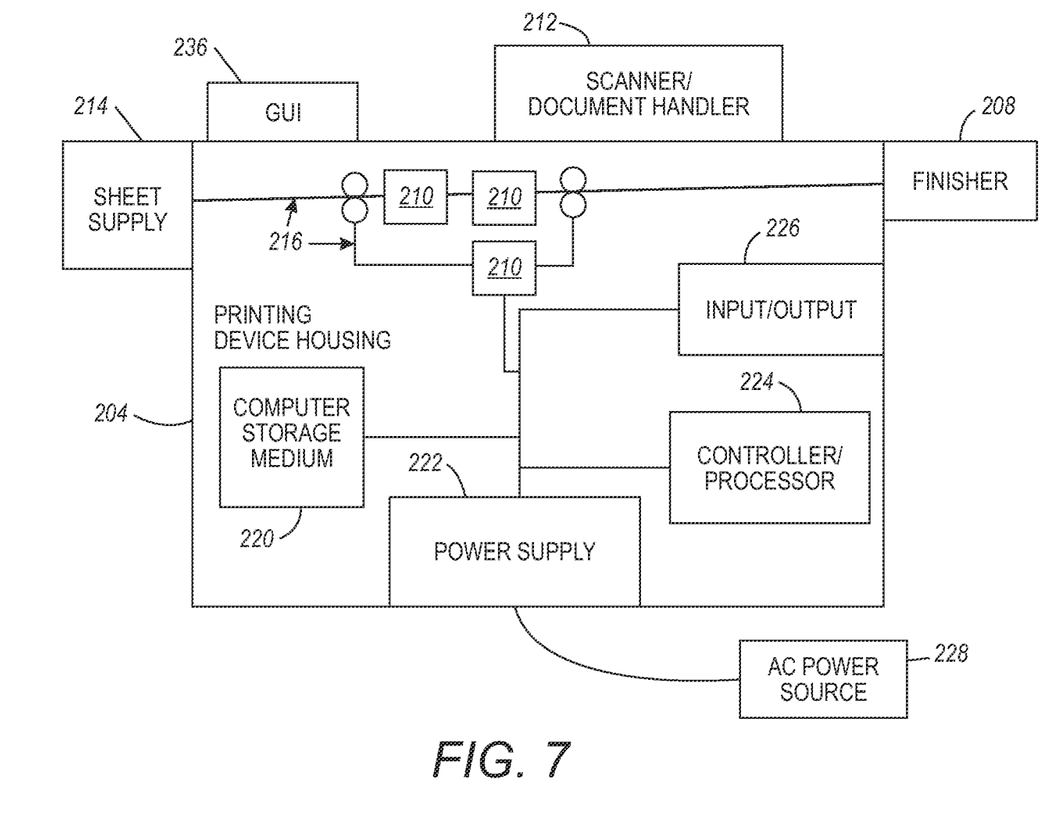
FIG. 7 is a schematic diagram illustrating devices herein.

FIG. 7 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, devices 200/204 herein include a graphic user interface 236 that receives instructions to print, on print media sheets, a booklet from a document; a processor 224 operatively connected to the graphic user interface 236; and a printing device 204 operatively connected to the computerized device. The processor 224 automatically formats the booklet to arrange multiple pages of the document to print on each of the print media sheets by performing duplex printing, with pages of the document being printed on each side of the print media sheets.

Further, the processor 224 automatically determines the number of blank page locations of the pages of the document that occur on the last pages of the booklet. Then, the graphic user interface 236 automatically outputs a message identifying the number of blank page locations and provides an option to relocate the blank page locations to different locations within the booklet. Again, such different locations are other than on the last pages of the booklet. In response, the graphic user interface 236 receives a response to the option from the user to relocate the blank page locations comprising user instructions regarding relocating at least one of the blank page locations. The devices 200/204 then automatically reformat the booklet to reposition ones of the blank page locations to the different locations within the booklet based on the user's response to the option. Then, after such reformatting, the printing device 204 automatically prints the booklet.

Again, the graphic user interface 236 can output a first graphic representation of an appearance of the booklet as it would be printed, after formatting but before reformatting and printing, and output a second graphic representation of an appearance of the booklet as it would be printed after the reformatting (before actually printing). When outputting the second graphic representation, the graphic user interface 236 can also repeat the option to relocate the blank page locations to different locations within the booklet to provide additional iterations of the reformatting of the booklet.

As would be understood by those ordinarily skilled in the art, the device 204 shown in FIG. 7 is only one example and the systems and methods herein are equally applicable to other types of printing devices that may include fewer components or more components. For example, while a limited number of printing engines and paper paths are illustrated in FIG. 7, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA, and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving, into a graphic user interface, instructions to print, on print media sheets, a booklet from a document;
   automatically, using a computerized device operatively connected to said graphic user interface, formatting said booklet to arrange at least two pages of said document to print on each of said print media sheets;
   automatically, using said computerized device, determining a number of blank page locations occurring on one or more last pages of said booklet;
   automatically outputting a message on said graphic user interface, said message identifying said number of blank page locations and an option to relocate said blank page locations to different locations within said booklet, said different locations being other than on said last pages of said booklet;
   receiving, into said graphic user interface, a response to said option to relocate said blank page locations comprising instructions regarding relocating at least one of said blank page locations;
   automatically, using said computerized device, reformatting said booklet to reposition ones of said blank page locations to said different locations within said booklet based on said response to said option; and
   automatically printing said booklet using a printing device operatively connected to said computerized device after said reformatting.

2. The method according to claim 1, said outputting said message further comprising outputting a first graphic representation of an appearance of said booklet as printed on said graphic user interface, after said formatting and before said reformatting and said printing on said graphic user interface and said method further comprising outputting a second graphic representation of an appearance of said booklet as printed, after said reformatting and before said printing on said graphic user interface.

3. The method according to claim 2, said outputting said second graphic representation comprising repeating outputting said option to relocate said blank page locations to different locations within said booklet to provide additional iterations of said reformatting said booklet.

4. The method according to claim 1, said outputting said message being provided on said graphic user interface only in response to said instructions to print said booklet, and said outputting said message delaying said printing said booklet until said response to said option is received.

5. The method according to claim 1, said blank page locations comprising available printing locations on said print media sheets where pages of said document are available to be printed and no printing occurs because of a number of said pages of said document not corresponding with a number of said available printing locations.

6. A method comprising:
receiving, into a graphic user interface, instructions to print, on print media sheets, a booklet from a document;
automatically, using a computerized device operatively connected to said graphic user interface, formatting said booklet to arrange four pages of said document to print on each of said print media sheets by performing duplex printing with two pages of said document being printed on each side of each of said print media sheets;
automatically, using said computerized device, determining a number of blank page locations of said four pages of said document occurring on one or more last pages of said booklet;
automatically outputting a message on said graphic user interface, said message identifying said number of blank page locations and an option to relocate said blank page locations to different locations within said booklet, said different locations being other than on said last pages of said booklet;
receiving, into said graphic user interface, a response to said option to relocate said blank page locations comprising instructions regarding relocating at least one of said blank page locations;
automatically, using said computerized device, reformatting said booklet to reposition ones of said blank page locations to said different locations within said booklet based on said response to said option; and
automatically printing said booklet using a printing device operatively connected to said computerized device after said reformatting.

7. The method according to claim 6, said outputting said message further comprising outputting a first graphic representation of an appearance of said booklet as printed on said graphic user interface, after said formatting and before said reformatting and said printing on said graphic user interface and said method further comprising outputting a second graphic representation of an appearance of said booklet as printed, after said reformatting and before said printing on said graphic user interface.

8. The method according to claim 7, said outputting said second graphic representation comprising repeating outputting said option to relocate said blank page locations to different locations within said booklet to provide additional iterations of said reformatting said booklet.

9. The method according to claim 6, said outputting said message being provided on said graphic user interface only in response to said instructions to print said booklet, and said outputting said message delaying said printing said booklet until said response to said option is received.

10. The method according to claim 6, said blank page locations comprising available printing locations on said print media sheets where pages of said document are available to be printed and no printing occurs because of a number of said pages of said document not corresponding with a number of said available printing locations.

11. A printing device comprising:
a graphic user interface receiving instructions to print, on print media sheets, a booklet from a document;
a processor operatively connected to said graphic user interface; and
a printing device operatively connected to said processor,
said processor automatically formatting said booklet to arrange four pages of said document to print on each of said print media sheets by performing duplex printing with two pages of said document being printed on each side of each of said print media sheets,
said processor automatically determining a number of blank page locations of said four pages of said document occurring on one or more last pages of said booklet,
said graphic user interface automatically outputting a message identifying said number of blank page locations and an option to relocate said blank page locations to different locations within said booklet,
said different locations being other than on said last pages of said booklet,
said graphic user interface receiving a response to said option to relocate said blank page locations comprising instructions regarding relocating at least one of said blank page locations,
said processor automatically reformatting said booklet to reposition ones of said blank page locations to said different locations within said booklet based on said response to said option, and
said printing device automatically printing said booklet after said reformatting.

12. The printing device according to claim 11, said graphic user interface outputting said message further comprising said graphic user interface outputting a first graphic representation of an appearance of said booklet as printed, after said formatting and before said reformatting and said printing, and said graphic user interface outputting a second graphic representation of an appearance of said booklet as printed, after said reformatting and before said printing.

13. The printing device according to claim 12, said graphic user interface outputting said second graphic representation comprising repeating outputting said option to relocate said blank page locations to different locations within said booklet to provide additional iterations of said reformatting said booklet.

14. The printing device according to claim 11, said graphic user interface outputting said message being provided only in response to said instructions to print said booklet, and said graphic user interface outputting said message delaying said printing device automatically printing said booklet until said response to said option is received.

15. The printing device according to claim 11, said blank page locations comprising available printing locations on said print media sheets where pages of said document are available to be printed and no printing occurs because of a number of said pages of said document not corresponding with a number of said available printing locations.

16. A printing device comprising:
- a graphic user interface receiving instructions to print, on print media sheets, a booklet from a document;
- a processor operatively connected to said graphic user interface; and
- a printing device operatively connected to said processor,
- said processor automatically formatting said booklet to arrange at least two pages of said document to print on each of said print media sheets,
- said processor automatically determining a number of blank page locations occurring on one or more last pages of said booklet,
- said graphic user interface automatically outputting a message identifying said number of blank page locations and an option to relocate said blank page locations to different locations within said booklet,
- said different locations being other than on said last pages of said booklet,
- said graphic user interface receiving a response to said option to relocate said blank page locations comprising instructions regarding relocating at least one of said blank page locations,
- said processor automatically reformatting said booklet to reposition ones of said blank page locations to said different locations within said booklet based on said response to said option, and
- said printing device automatically printing said booklet after said reformatting.

17. The printing device according to claim 16, said graphic user interface outputting said message further comprising said graphic user interface outputting a first graphic representation of an appearance of said booklet as printed, after said formatting and before said reformatting and said printing, and
- said graphic user interface outputting a second graphic representation of an appearance of said booklet as printed, after said reformatting and before said printing.

18. The printing device according to claim 17, said graphic user interface outputting said second graphic representation comprising repeating outputting said option to relocate said blank page locations to different locations within said booklet to provide additional iterations of said reformatting said booklet.

19. The printing device according to claim 16, said graphic user interface outputting said message being provided only in response to said instructions to print said booklet, and said graphic user interface outputting said message delaying said printing device automatically printing said booklet until said response to said option is received.

20. The printing device according to claim 16, said blank page locations comprising available printing locations on said print media sheets where pages of said document are available to be printed and no printing occurs because of a number of said pages of said document not corresponding with a number of said available printing locations.

* * * * *